United States Patent [19]

Cowles

[11] Patent Number: 4,871,293

[45] Date of Patent: Oct. 3, 1989

[54] MECHANICAL POSITIONING OR TRANSFERRING SYSTEM

[76] Inventor: Curtis R. Cowles, R.D. 2, Corning, N.Y. 14830

[21] Appl. No.: 141,003

[22] Filed: Jan. 5, 1988

[51] Int. Cl.$^4$ .............................................. B66C 23/00
[52] U.S. Cl. ................................ 414/744.3; 198/468.6
[58] Field of Search ........... 414/744 R, 744 A, 744 B, 414/744 C, 744.3; 74/99 A; 198/468.6, 468.2, 468.3, 468.4, 468.5

[56] References Cited

U.S. PATENT DOCUMENTS

| | | | |
|---|---|---|---|
| 1,740,575 | 12/1929 | Clausen et al. | 414/740 |
| 1,771,641 | 7/1930 | Lamb | 198/653 |
| 4,027,767 | 6/1977 | Gluck | 414/744 R X |
| 4,149,638 | 4/1979 | Nylund et al. | 198/468.6 X |
| 4,364,707 | 12/1982 | Ott | 414/744 B |
| 4,370,086 | 1/1983 | Barry | 414/744 R X |
| 4,492,512 | 1/1985 | Mink | 414/744 A |

Primary Examiner—Robert J. Spar
Assistant Examiner—Donald W. Underwood
Attorney, Agent, or Firm—Ralph R. Barnard

[57] ABSTRACT

This invention is directed to transferring articles from a pickup position to a discharge position by using a driven pickup arm with a holder. The pickup arm is driven by a driving arm and is raised and lowered and stopped by contact with a cam mechanism attached to the driving arm and stops and guides located near the pickup and discharge positions.

3 Claims, 3 Drawing Sheets

MECHANICAL POSITIONING OR TRANSFERRING SYSTEM

BACKGROUND OF THE INVENTION

This invention relates generally to the field of robotics and more particularly to a new and improved means for positioning a tool in space from one point to another. The tool may be one that attaches itself to an article or a tool to be moved. Historically, such devices are generally well known and before digital and analog computers many specific mechanisms have been designed and used for this purpose.

An example of a mechanism designed for positioning something from one place to another is a *Means for Transferring Glassware*, U.S. Pat. No. 1,771,641 by T. F. Lamb. Therein, jaws grab a milk bottle and swing it around a vertical axis to another position based on the swing of a frame holding the milk bottle until it is at a new position based on the arc travelled by the jaws and frame. The operation of the jaws for grabbing and releasing the milk bottle and the rotating frame for moving the bottle around a radius over an arcuate distance is complicated and not readily adapted to more complex paths because the total design anticipates a single and specific path and no variations. Moreover, in the case of the above identified patent, the path is all at one elevation. The major limitations besides inflexibility appear to be the complexity and lack of adaptability to a wide range of uses.

More complex requirements exist such as those conditions that occur when an article such as a bottle is to be moved over a path which does not fit nicely on the arc to be travelled by the rotating frame and jaws. When a more complex path of travel is added, the mechanical problems increase tremendously. Suppose the path to be travelled also includes a requirement that the article be raised or lowered as well as moved on an arc at a fixed radius at the same elevation. One way to accomplish this requirement is illustrated by a patent entitled: *Bunch Transfer for Cigar Machines*, U.S. Pat. No. 1,740,575. In this example, the cigars are gripped and a transfer arm moves around its pivot point over an arcuate distance over the top in a vertical loop with a fixed radius, and the cigars are moved to a different point on the arcuate path, but at a different elevation or at the same elevation. Here again, the path of the cigars, mechanically set by the apparatus and the equipment, is a specific solution to a specific problem. Also, generally it is not susceptible to variation nor capable of adapting itself to control techniques made available through the enormous change brought about in both analog and digital computer technology.

With the advent the new technology for mechanical positioning or transferring articles now generally referred to as robotics, those skilled in the art can make systems electrical mechanical that move a holder of a tool or an article from any point in space to another point in space using three axis positional control mechanisms for translation, with greater flexibility or adaptability of the equipment to move the holder and/or article over any selected path. Digital technology has played a major role in this type of equipment because selected computer programs with appropriate input can change the path of movement of the tool as desired. However, in those cases, the electro-mechanical systems as well as the computer program become quite complex. Moreover, those skilled in the art recognize that accepted constraints in the path for the tool or tool holder can well result in some simplification.

When a path in space is defined from one point to another, each point along the path, including the beginning and the end points, may be defined mathematically in two ways. First, X, Y, and Z coordinates may be defined from reference axes for each point on the path or polar coordinates may be defined for each point, two angles and a distance from the same axis.

The present invention resulted when the inventor recognized that an optimum compromise and acceptable constraints resulted from utilizing polar coordinate terms for each point along the path of a tool holder (or driven arm member) when the tool holder (or driven member) is maintained at a fixed distance from the polar axes of rotation. Also, he recognized that where all three (the two polar angles and the fixed distance from the two axes of rotation) define the points in space through which the tool or tool holder is to be moved, he could use electro-mechanical technology to control one of the polar angles and mechanical technology to control the other polar angle.

Furthermore, the teachings of the present invention accept some constraints on the two polar angles. For example, the polar angle which would correspond to the vertical axis is often not required to be greater than 360°. The other polar angle which would correspond to the horizontal axis is, for simplicity purposes, offset a small or minimum distance from the vertical axis. Although, the invention would work substantially the same way where there is no offset, the offset simplifies the mechanical pivot construction for the holder arm. As stated above, the major constraint is that the length of the holder arm (driven arm) determines the distance of the working end of the holder (or driven arm), as a point in space about both the vertical and horizontal axes at all times. This is an acceptable constraint in a large percentage of industrial applications.

SUMMARY OF THE INVENTION

This invention is both a method and apparatus for moving a holder of an article of a tool from one position in space to another based on two polar angles, the angular position about a vertical axis of a driven pickup arm (or holder) and the angular elevation of said driven pickup arm (or holder) about a horizontal axis wherein the angle of said driven arm means about the vertical axis is determined electro-mechanically through a pre-selected electrical program and the angle of said driven pickup arm (or holder) about the horizontal axis is determined by a pre-selected arcuate cam mechanism on a shorter driving arm and the fixed distance of the holder on the driven pickup arm from each axis of rotation. The driven pickup (holder) arm is driven by another shorter driving arm whose angular position is electrically controlled by a pre-selected electrical program and the relative angular position of the shorter driving arm and the driven pickup arm determines the angular position of said pickup arm relative to the horizontal axis. The driven holder or pickup arm is thus rotatable around the same vertical axis as the shorter driving arm and is hinged horizontally to selectively elevate the driven pickup arm or holder above the shorter driving arm. The elevation is predetermined by a shaped arcuate cam mechanism and the cooperation of the driven pickup arm with stops and/or guides at locations where the elevation of the driven pickup arm is to be changed.

When applying the teachings of the present invention, the horizontal axis of the driven pickup arm would be placed at a fixed and equal distance from all of the points on the cyclic path of the tool or tool holder, including the pickup point and discharge point. Furthermore, as taught herein, the fixed distance of the tool or tool holder on the extremity of the driven pickup arm, remote from its axis of rotation about the horizontal axis, allows one to meet the above criteria by locating the horizontal axis of the driven pickup arm at a fixed and equal distance from both the pickup point and discharge point, as selected. Accordingly the non-angular parameter of the polar coordinates of the cyclical path of the tool or tool holder is established as a constant when practicing the teachings of the present invention.

The two polar angles of the points in the path of the tool or tool holder are then selected, one as a dependant variable of the other. The arcuate arm mechanism and stationary guides and stationary stops provide the functional moving relationships between the shorter driving arm and the longer driven arm having the tool or tool holder at the fixed distance from the horizontal axis of the driven arm, such that the desired dependent variable relationship between the two polar angles are defined fully identifying each of the points in the cyclic path of the tool or tool holder. Specifically, for any given angle of the longer driven pickup arm about its vertical axis (the independent variable) there is a corresponding angle of the same longer driven pickup arm about its horizontal axis (the dependent variable) thus setting the elevation of the tool or tool holder end of the driven arm. The elevation of the points in the path of the tool holder varies as the longer driven pickup arm is rotated about its vertical axis. The user of the teachings of present invention designs the shape of the arcuate cam connected to the end of the shorter driving arm and places stationary guides and stationary stops at locations so that the rotation of the shorter driving arm, about the same vertical axis as that of the longer driven pickup arm, functions so that the shorter driving arm rotates the longer driven arm and changes its rotation about its horizontal axis. Thereby, generating the two varying polar angles defining the points on the path of the tool or tool holder between the pickup and discharge points.

Accordingly, it is the primary object of the present invention to simplify the electro-mechanical mechanism for positioning a tool or tool holder by restricting the applications program to be revised for application to a specific task. The rotation of both the driving arm and the driven pickup arm about a vertical axis and controlling the angular rotation of the driven pickup arm with respect to the driving arm using a simplified system of an arcuate cam fixed to the driving arm and stationary stops and guides. The method the driven pickup arm uses for holding the tool or the article during the transfer movement may be varied when using the present invention and such may be accomplished in many ways, for example by any of the conventional pick up techniques exemplified by grippers, jaws, lips, and vacuum heads, etc.

DESCRIPTION OF THE PREFERRED EMBODIMENT

Figure 1:
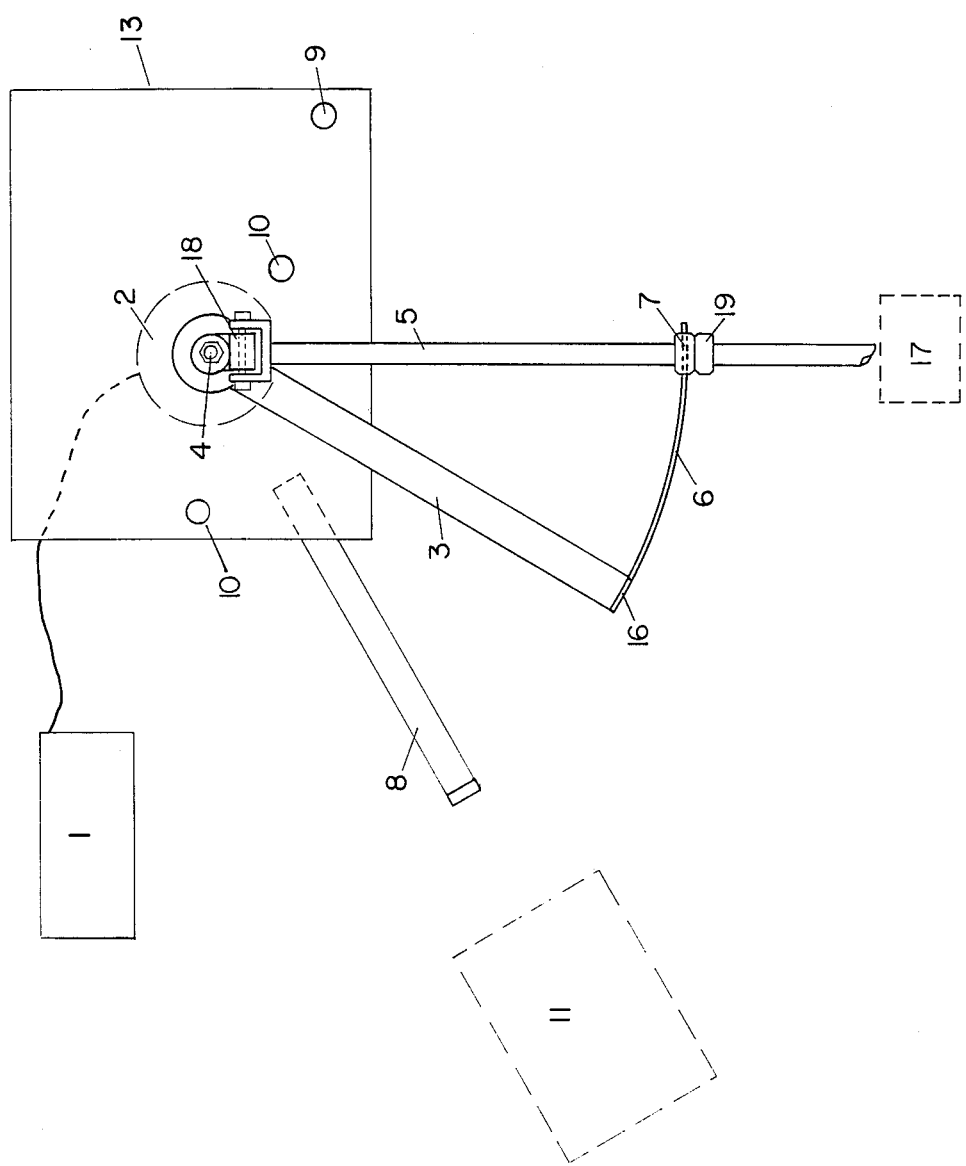
FIG. 1 shows a simplified top view of the apparatus of the preferred embodiment of the invention.

Referring again to FIG. 1, the invention is shown set up on mounting bracket (13) to move objects from a pickup area (11) to a discharge area (12). The pickup is accomplished by a tool (17) on the end of the driven pickup arm (5). For example, the tool might be a pair of pickup jaws, mechanical grippers, a vacuum head, etc. In the illustration, the discharge area (12) is at a higher elevation than the pickup point. In any event, the total mechanism being described is to function to move an object from a point in the pickup area (11) to a point in the discharge area (12). Both points are defined by distinctive polar coordinates, with the constraint that the length of the vector for the pickup point and the discharge point is the same. The micro controller (1), controlling the stepper motor (2) to move shaft (4), determines the ultimate angular position about the vertical axis (4) of driven pickup arm (5) by moving drive arm (3). Driven pickup arm (5) and drive arm (3) do not move with respect to one another when driven pickup arm (5) is against vertical stopping ear (16) or in detent (7) along the arced ramp cam (6). In accordance with the teachings of the present invention, the angle of shaft (4) about its vertical axis determines both the angular location of the driven pickup arm and the angular location of the driving arm, such that the angle of the driven pickup arm (5) about its vertical axis is determined by the angle of shaft (4) and the angle of the driven pickup arm is one of the polar angles identifying the location of the tool holder. The other polar angle, identifying the location of the tool holder, is determined by the relative location of the driven pickup arm (5) in relation to the driving arm (3) along the arced ramp cam (6). Each end of the ramp cam may function essentially as a detent.

For example, FIG. 1 shows driven pickup arm (5) and tool or tool holder (17) moving toward discharge area (12). The discharge point is defined by the magnitude of the polar vector represented by the distance between the tool or tool holder and the vertical axis of shaft (4), the position angle of the driven pickup arm (5) about the vertical axis (4) when the discharge point is reached, and the angle that driven pickup arm (5) makes around hinge (18), when the discharge point is reached. As it moves toward the discharge point, driven pickup arm (5) runs against stationary discharge stop (9) and driving arm (3) causes the driven pickup arm (5) to roll, by means of bearing (19), down arcuate ramp (6) against the vertical stopping ear (16) at the other ramp cam extremity attached to the driving arm (3), thereby lowering the tool or tool holder and changing its polar coordinate to change the horizontal angle. At that point, the stepper motor (2) is prepared, according to its program, to drive shaft (4) in the opposite angular direction, thereby changing the polar coordinates of the tool holder moving it back to the pickup area (11) and such rotation continues until the driven pickup arm (5) runs against stationary driven arm guide (8) at which time the corresponding vertical angle for shaft (4) is the vertical angle identifying the pickup point and the driven pickup arm (5) is driven up the arcuate ramp cam to detent (7), and at that time the stepper motor (2), under the control of the program of the micro controller (1), reverses the direction of rotation of shaft (4).

Figure 2:
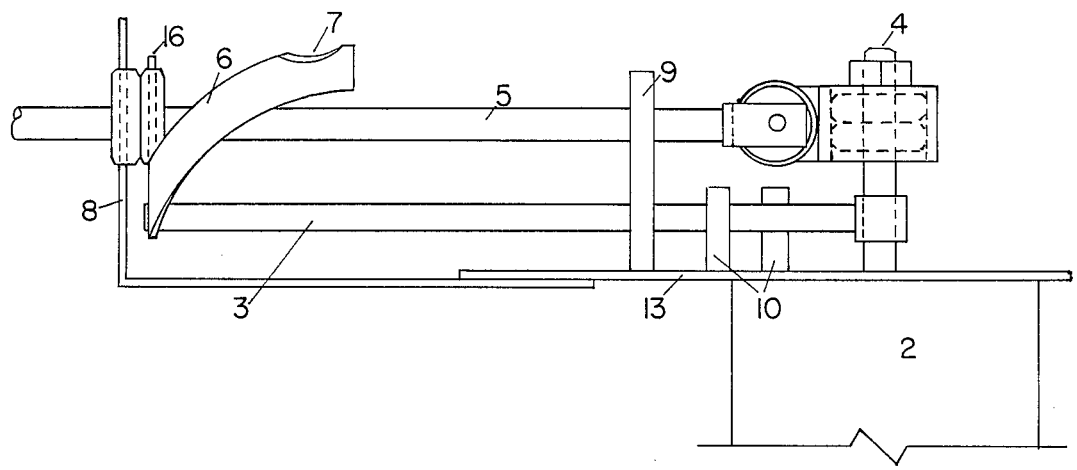
FIG. 2 shows a simplified side view of the apparatus of the present invention with the driven pickup arm at the position ready to pickup at the pickup area. (For example the holder on the extremity of the driven pickup arm (not shown) is at the position corresponding to pickup point and the dependent angular variable has been modified by the independent angular variable).
Figure 3A:
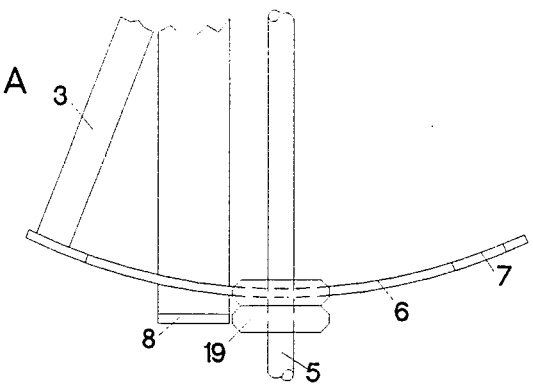
FIG. 3A shows a detailed top view of arcuate ramp cam (6) connected to driving arm (3), and driven pickup arm (5) and stationary driven arm guide (8) and vertical stopping ear (16).
Figure 3B:
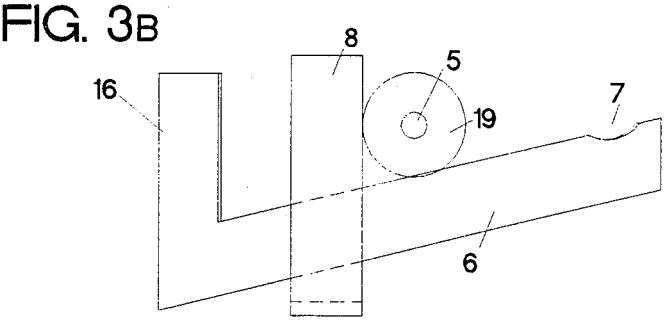
FIG. 3B shows a side elevation of the same parts shown in the same relative position as shows in FIG. 3A.

FIG. 2 illustrates the relative positioning of the parts of the present invention just prior to article pickup. The driven pickup arm (5) is resting against vertical stopping ear (16) of the arcuate ramp cam (6). Pickup occurs as drive arm (3) is driven by stepper motor (2) to its farthest relative angle of travel around the vertical axis, past the article pickup area. Driven arm (5) remains against stationary guide (8) as drive arm (3) continues to rotate. As a result, driven arm (5) is mechanically elevated by traveling up the arcuate ramp cam (6). Pickup is completed once the bearing (19) of driven arm (5) rests in the detent (7) of the arcuate ramp cam (6). FIGS. 3A and 3B illustrate the lifting and lowering concept of the driven pickup arm as it is driven up the arcuate ramp cam (6).

Referring to FIGS. 1, 2, 3A and 3B, the two mechanical drive arm stops (10) are located so that they positively limit the angular movement of driving arm (3) within the limits of the design angular rotation for a particular application and they represent a mechanical fail safe system simplifying the programming of the micro controller (1). The height of the stationary drive arm stop (10) shown to the right of driven pickup arm (5) should be such a height that it will contact driving arm (3), but not driven pickup arm (5). Note that hinge (18) for driven pickup arm (5) is mounted close to and freely pivots on shaft (4) such that it is not driven by shaft (4). The polar coordinate terminology used herein to describe the arcuate and cyclic path of the tool holder or tool on the outer extremity of the driven pickup arm would be more accurate if the axis of hinge (18) and the axis of the vertical shaft (4) intersected. However, in practice it is easier for simplicity of construction if it is offset as shown. It may, in fact, be constructed such that the two axes that form the hinge (18) and the shaft do intersect. As those skilled in the art know, this may accomplished by standard techniques.

After the driven pickup arm (5) is pushed up the arcuate ramp to the detent (7) and the driven pickup arm (5) is appropriately raised to the desired polar angle identifying the path for the driven pickup arm and tool, the stepping motor (2) is reversed by controller (1) to carry the driven pickup arm back toward the discharge area (12), thus completing the cycle. Therefore, the electrical mechanical system described utilizes completely the two polar angles to define the path of the tool based on an electrical input from the controller (1) which input is solely related to a program that has the angular position of shaft (4) as an independent variable, with the magnitude of the polar vector fixed and the angular position of the shaft of hinge (18) is the dependent variable.

Figure 5:
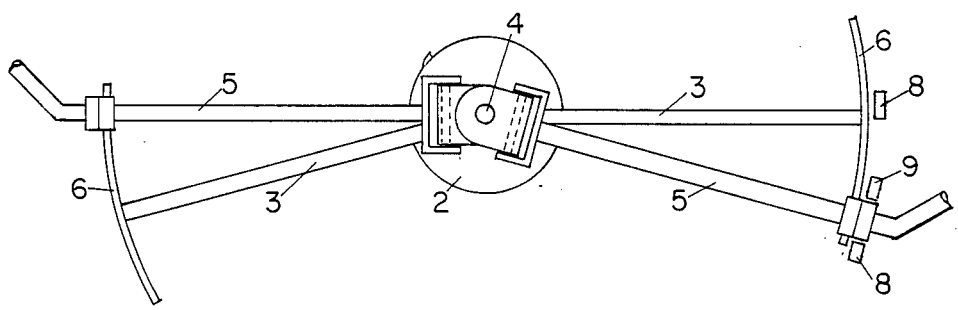
FIG. 5 shows a top view of an alternative embodiment, where the teachings of the present invention are utilized to double the handling rate by connecting two pairs of driven and driving arms in mirror image relationship to the same driving shaft where it will cooperate with appropriately spaced stationary stops and vertical guides.

An alternative embodiment of the present invention, capable of doubling the handling rate of the equipment using the teachings of the present invention, is illustrated in FIG. 5. Two pairs of driven arms (5) and driving arms (3) are connected in mirror image relationship to the same driving shaft (4) where they will cooperate with the appropriately spaced stationary stop (9) and guides (8). Thus, as shown, the apparatus designed in accordance with the teachings of the present invention returns one driven pickup arm (5) to the pickup location on one side, while the apparatus on the other side is delivering a driven pickup arm (5) to the discharge location.

The stationary stop (9) and guides (8) as shown in FIG. 5 cooperate alternatively with each driven pickup arm (5) and driving arm (3) pair. The cooperation of the apparatus including stationary stop (9) and guides (8) as shown corresponds to the modification shown in FIGS. 4A & 4B, explained below.

Figure 4A:
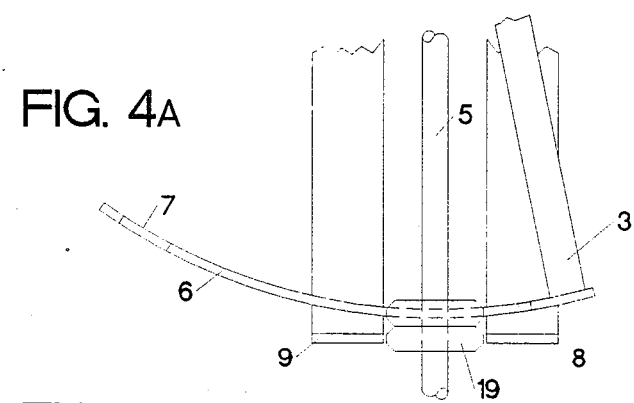
FIG. 4A shows an alternative embodiment of the apparatus of the present invention as a detailed top view of the driven pickup arm (5), stationary guide (8), stationary stop (9), driving arm (3), and arcuate cam (6) using the same lifting and lowering concept as used in the preferred embodiment, except for the fact that the stationary stop (9) that is used to remove the driven arm (5) from the detent located in the arcuate ramp cam has been moved to another location to produce another sequence of lifting and lowering.
Figure 4B:
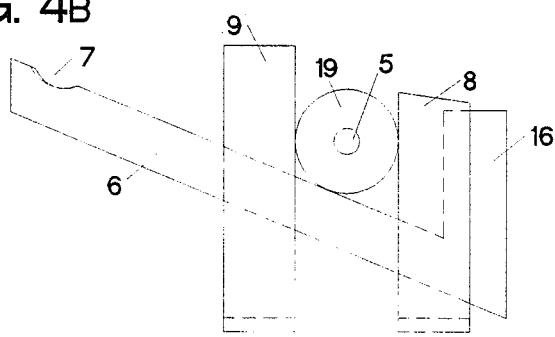
FIG. 4B shows a side elevation of the same parts shown in the same relative position as in FIG. 4A.

FIG. 4A shows a detailed top view and FIG. 4B is a side elevation view of the lifting and lowering concept as it is used in the alternative embodiment illustrated in FIG. 5. It is the same concept as used in the preferred embodiment, except for the fact that the stationary stop (9) that is used to remove the driven arm (5) from the detent (7) located in the arcuate ramp cam (6) has been moved to another location to produce another sequence of lifting and lowering. In the alternative embodiment, travel between the pickup and discharge locations (from one extremity of angular travel about the vertical axis to the other extremity), is made while driven arm (5) is at its highest angular elevation about the horizontal axis. Driven arm (5) is carried in detent (7) at all times during travel from one point to another. In this manner, the driven arm (5) can clear the tops of the guides (8). The lifting and lowering concept depicted in FIGS. 4A and 4B, as differing from the alternate travel mode depicted in FIGS. 3A and 3B, could also be used with the single driven pickup arm (5) and shorter driving arm (3) pair depicted in FIG. 1.

The tool or toolholder on the extremity of driven arm (5) would be raised and lowered, about the horizontal axis only at the pickup location. As illustrated in FIGS. 4A and 4B, driven arm (5) has just been knocked out of detent (7) by stop (9) and is rolling by means of bearing (19) down the arcuate ramp cam (6). Once driven arm (5) reaches its lowest point at vertical stopping ear (16), at which point the stopping ear (16) and the stationary guide (8) are parallel, the stepper motor (2) reverses direction as programmed by the micro controller.

Accordingly, it is to be understood that the embodiments of the invention herein described are merely illustrative of the application of the principles of the invention. Reference herein to details of the illustrated embodiment are not intended to limit the scope of the claims, which themselves recite those features regarded as essential to the invention.

I claim:

1. A mechanical transfer system for an article comprising:

a shaft;

means for driving said shaft over a pre-selected arcuate distance which at one extremity of angular travel is its angle corresponding to an article pickup point and at the other extremity of angular travel is its angle corresponding to an article discharge point;

a driving arm connected to be driven by said shaft over said arcuate distance;

an arcuate ramp cam with a detent mounted on the extremity of said driving arm, said detent being in the raised end of said ramp cam;

a vertical stopping ear on the other end of said raised arcuate ramp cam in line with the extremity of said driving arm;

a driven arm freely rotatable about the same axis as the driving arm, but longer than said driving arm having transfer pickup means on the portion of the said driven arm extending beyond the end of said driving arm and the raised arcuate ramp cam and hinged to move up and down;

the said driven arm having two angular travel positions with respect to the said raised arcuate ramp cam and driving arm: one being against the vertical stopping ear and the other being in the detent at the other end of the said arcuate ramp cam;

a driven arm guide located adjacent to the pickup point so that it will drive the driven arm up the arcuate ramp cam and provide a cooperating cam guide for raising the driven arm at the pickup point whereby the driven arm moves up the ramp and falls into the detent thereby raising the pickup arm vertically along its hinged axis;

said driven arm being moved out of the detent by running against the discharge stop located at the discharge angle such that the driven arm passes down the raised arcuate ramp cam to the aforesaid vertical stopping ear located at the extremity of said driving arm;

said driven arm associated with the article being moved, having two extremities of angular travel as well as vertical positions: at the discharge point it moves down the cam and lowers the article and at the pickup angular extremity of travel, it raises the driven arm and the article before commencing movement toward the discharge point.

2. Apparatus for transferring an article from one position to another based on the angular position and elevation of a driven pickup arm means having a holder, comprising:

(a) a driven pickup arm means with a holder;

(b) said driven pickup arm means being mounted to have a vertical axis around which it may be driven and a horizontal axis around which it may be driven;

(c) driving arm means for angularly driving said pickup arm means around the vertical axis according to a pre-selected program;

(d) a shaped cam mechanism attached to said driving arm means;

(e) stop and guide means angularly positioned about the vertical axis with respect to pickup and discharge locations; and (f) said driving arm means and said pickup arm means being rotatably mounted around the vertical axis, said pickup arm means being hinged horizontally to selectively change its elevation with respect to the driving arm as pre-determined by contact with said shaped cam mechanism and said stop and guide means disposed at locations where the elevation of the pickup arm is to be changed.

3. A method of transferring an article from a pickup location to a discharge location based on the angular position and elevation of a driven pickup arm means, comprising the steps of:

(a) angularly driving said pickup arm by a driving arm whose angular position about a vertical axis is being controlled by a pre-selected program;

(b) rotating said pickup arm around the same vertical axis as the driving arm and hinging said pickup arm horizontally to said vertical axis to selectively elevate the said pickup arm as predetermined by a shaped cam mechanism attached to and moving with said driving arm; and (c) determining the elevation of said pickup arm by the relative angular position of the driving arm and the driven pickup arm about the same vertical axis based on the physical contact of said pickup arm with said shaped cam mechanism and stops and guides disposed at locations where the elevation of the said pickup arm is to be changed at the angular position about the vertical axis corresponding to the pickup and discharge locations.

* * * * *